(No Model.)

2 Sheets—Sheet 1.

H. F. COURTER.

APPARATUS FOR TEACHING MUSIC.

No. 264,932. Patented Sept. 26, 1882.

Witnesses,
Geo. H. Strong.
S. H. Nourse.

Inventor,
H. F. Courter
By Dewey & Co
Attorneys

N. PETERS, Photo-Lithographer, Washington, D. C.

(No Model.) 2 Sheets—Sheet 2.

H. F. COURTER.

APPARATUS FOR TEACHING MUSIC.

No. 264,932. Patented Sept. 26, 1882.

Witnesses,
Geo. H. Strong.
S. H. Nourse,

Inventor,
H. F. Courter
By Dewey & Co.
Attorneys

N. PETERS, Photo-Lithographer, Washington, D. C.

UNITED STATES PATENT OFFICE.

HENRY F. COURTER, OF GILROY, CALIFORNIA.

APPARATUS FOR TEACHING MUSIC.

SPECIFICATION forming part of Letters Patent No. 264,932, dated September 26, 1882.

Application filed June 12, 1882. (No model.)

*To all whom it may concern:*

Be it known that I, HENRY F. COURTER, of Gilroy, county of Santa Clara, State of California, have invented an Improved Music-Teaching Apparatus; and I hereby declare the following to be a full, clear, and exact description thereof.

My invention relates to a means for teaching music; and it consists of an apparatus or device for the objective system of musical instruction. This apparatus is constructed with a frame having horizontally-moving bars which are supported and guided by vertical bridges having pins between which the horizontal bars may move. These horizontal bars represent the lines of the major scale, and also the intermediate lines which are used in transposing the scales. They are made of such width relative to the spaces which occur between them that those spaces which represent a full or whole step will admit a bar which may represent the sharp of a note below or the flat of a note above; but where the natural half-steps occur the space is made narrow, so that it will be seen at a glance that no such interposition of a note can be made at that point. The lines and spaces of the ordinary musical staff with the signature of the bass and treble may be permanently printed upon the side of the frame, so as to correspond with the position of the bars representing the natural scale. In connection with these bars I employ ladders which represent the natural divisions of the major and minor scales, these ladders being arranged to be hung upon the bars, so as to represent the various transpositions of the scales, and the bars may be moved forward or back, so as to correspond with the transposition as shown by the ladder, the bars being differently colored for the respective notes.

Figure 1:
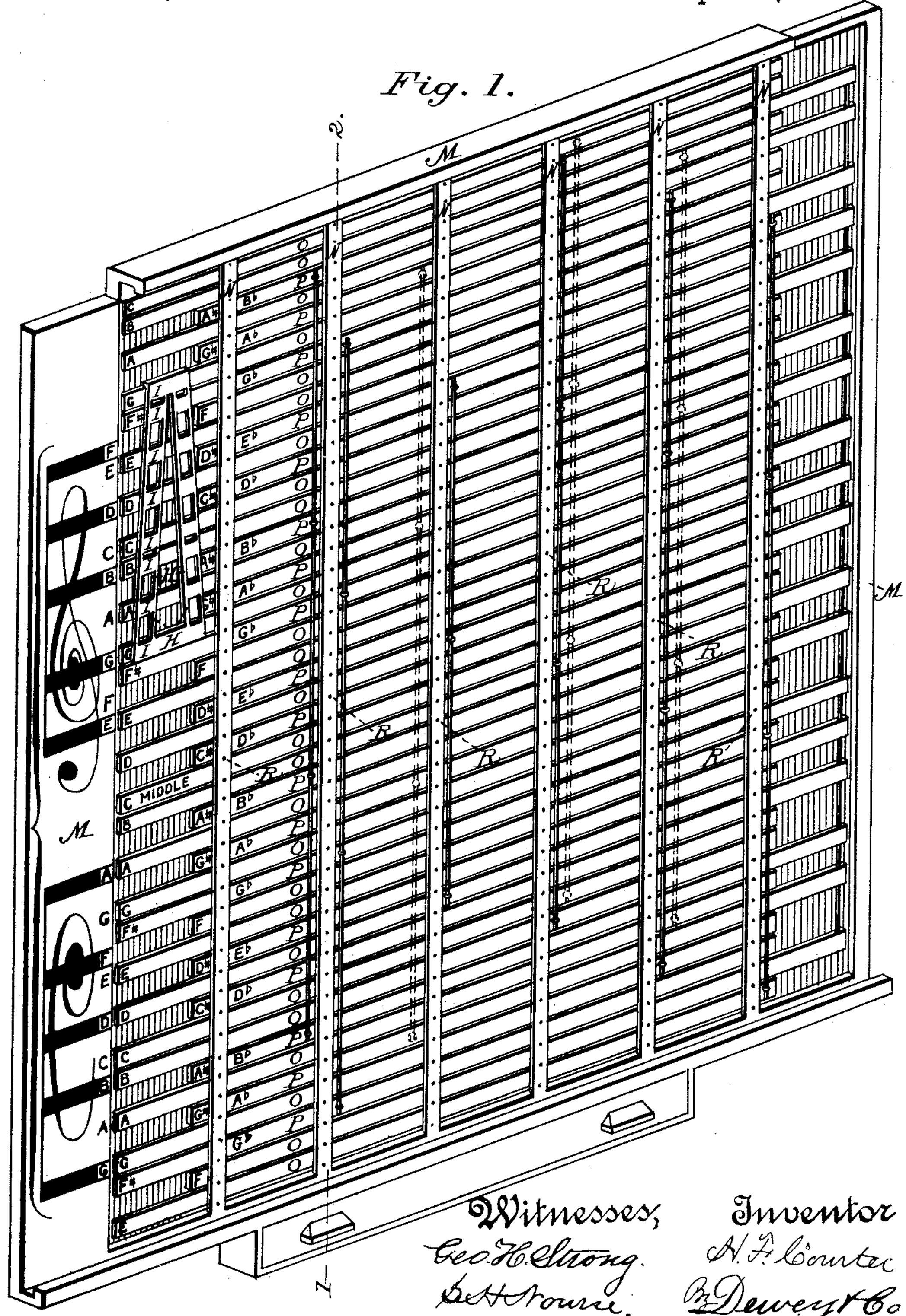
Figure 2:
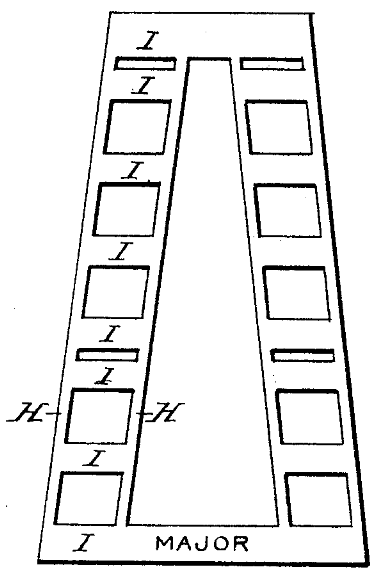
Figure 3:
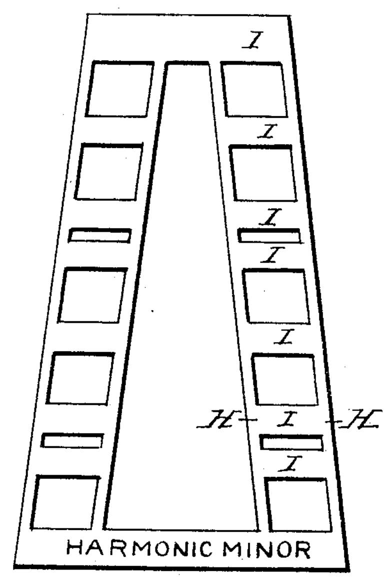
Figure 4:
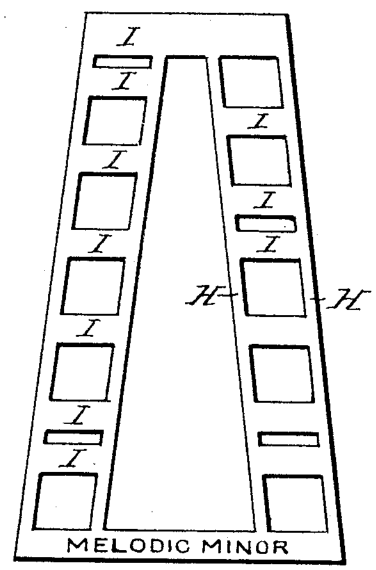
Figure 5:
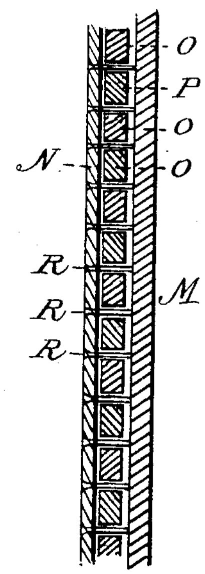

Referring to the accompanying drawings for a more complete explanation of my invention, Figure 1 is a view of my apparatus. Fig. 2 is an elevation of the major-scale ladder. Fig. 3 is an elevation of the harmonic minor-scale ladder. Fig. 4 is an elevation of the melodic minor-scale ladder. Fig. 5 is a section through line 1 2, Fig. 1.

M is a frame of wood or other suitable material, made of any suitable or desired size, and having bars or bridges N dividing it vertically into a certain number of spaces. In the present case I have shown the frame of such a height as to admit a representation of the bass and treble clefs of a musical staff with one or two added lines above and below, and having a width sufficient to allow seven equal vertical spaces between one end of the frame and the other, for a purpose to be hereinafter described.

The bridges N may be constructed so as to admit long horizontal bars O P between them. Transverse pins R pass through the bridges N, and at the same time serve to guide and separate the horizontal sliding bars O. P. These bars are made preferably about three-eighths of an inch wide, and when all are drawn forward across the first space to the left there will be an interval of one-eighth of an inch between them. The bars O, which represent or correspond to the notes on the lines of the staff, may be painted any distinguishing color—as red—and those which represent the notes between the lines may be of some other color—as green—while the added or ledger lines and spaces above and below the staff may be yellow. The bars P, which represent the sharps and flats, are black. The bars O and P are movable in sets—that is, all those which represent sol, or G, will be united by a vertical bar or connection, and one of them has a knob, by which it may be caused to slide from one side to the other of the space, carrying with it all of the bars from top to bottom which represent that particular note. All the other notes—as A, B, C, D, E, and F—are similarly united in sets, so as to be moved simultaneously, and those bars which represent the notes that are sharp or flat for any particular key are united in the same manner. Each of the spaces between the vertical bridges N may contain the connections of two of the groups of bars O P, one set being united by a vertical bar below parallel with the bridges, and the other set being united by a similar bar from above, so that each set may be moved horizontally across the width of the space without interfering with the other sets. All these bars O and P extend so as to move across the left-hand vertical space, which is the one used for illustration, and the letters or characters denoting each note may be marked upon the left end. When a major scale is to be illustrated the bars which represent the notes of that scale are moved across the left-hand vertical space, and all the others are pushed back to the right, so as not to appear. The spaces between the bars will then appear in the same proportion as the steps between the notes—that is, the spaces between C and D, D and E, F and G, G and A, A and B, will be seen at a glance to be twice as great as the spaces between E and F, B and C. It will also be seen that no note or tone can be interposed between E and F and B and C, and that when the transpositions are to be made the sharps or flats, which form the intermediate notes between the wider spaces, must be used.

In order to show exactly how the transpositions are made and which notes must be made sharp or flat, I employ ladders which consist of bars H, either vertical or inclined slightly toward each other, as shown. In the present case I have shown three of these double ladders—one for the major scales, one for the harmonic minor, and one for the melodic minor scale. In the first of these ladders the upright bars H are united by horizontal bars I, which are spaced to correspond with a single major scale having the short steps between E and F and B and C. When this ladder is suspended upon the bars O, so as to correspond with the major scale of the apparatus, the intervals between the bars O will correspond with those of the ladder. When transpositions are to be made the ladder is hung upon the bar representing the key into which the scale is to be transposed. The bars I of the ladder will not then correspond with the bars O of the frame, but will indicate that the intervals shown by the bars O must be changed to correspond with those of the ladder. This is done by bringing the bars P representing the corresponding sharps or flats across the spaces between the bars O, and those bars O which represent the notes which have been made sharp or flat may then be drawn back. This will show at a glance which notes are sharp or flat in any key, and also the reason why it must be so. When the ladder which illustrates the melodic minor key is us d the short intervals are shown in their proper position in the ascending scale, as are also those in the descending scale, which occur at a different place. These latter sharp or flat notes may be drawn only half-way across the space, so as to indicate more clearly the nature of this minor scale. It will be understood that where the short intervals occur, as between E and F and B and C, a sharp or flat would have to be indicated by the bar representing the natural tone.

I am aware that a frame has been used having a series of parallel equidistant movable wires and fixed letters at opposite sides of the frame, in combination with a movable scale-indicator, and I do not claim such a device, broadly.

Having thus described my invention, what I claim as new, and desire to secure by Letters Patent, is—

1. The frame M, with its vertical bridges N and the horizontally-sliding bars O and P, guided between the bridges and the bars representing the same musical notes, united in sets in the manner described.

2. The frame M, having the horizontally-sliding parallel bars O, united in sets representing the notes of the natural scale, in combination with the intermediate bars, P, united in sets so as to slide between the bars O at the proper intervals to represent sharps and flats, substantially as herein described.

3. The frame M, having the sliding horizontal bars O P, arranged on the lines and spaces of a musical staff, and having thereon characters representing the notes of a chromatic scale, in combination with a ladder, H, having the transverse bars I, arranged in the order of the degrees of the diatonic scale, so as to indicate the notes of the scale and the intervals or steps between the notes, the said ladder being attachable at different points upon the horizontal bars, so that transpositions of scales may be indicated, substantially as herein described.

4. The frame M, having the horizontally-moving bars P, having characters representing the sharps or flats, and the bars O, having spaces between them proportioned to correspond with the whole and half steps of the diatonic scale, and to admit the intermediate bars only where the whole steps occur, substantially as herein described.

In witness whereof I have hereunto set my hand.

HENRY F. COURTER.

Witnesses:
S. H. NOURSE,
G. W. EMERSON.